(12) United States Patent
Kasaoki

(10) Patent No.: US 8,792,678 B2
(45) Date of Patent: Jul. 29, 2014

(54) ENVIRONMENT RECOGNITION DEVICE AND ENVIRONMENT RECOGNITION METHOD

(75) Inventor: Seisuke Kasaoki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 102 days.

(21) Appl. No.: 13/471,708

(22) Filed: May 15, 2012

(65) Prior Publication Data

US 2012/0294481 A1    Nov. 22, 2012

(30) Foreign Application Priority Data

May 19, 2011    (JP) .................................. 2011-111998

(51) Int. Cl.
*G06K 9/00*    (2006.01)
(52) U.S. Cl.
USPC ........................................................ 382/103
(58) Field of Classification Search
None
See application file for complete search history.

(56) References Cited

U.S. PATENT DOCUMENTS

2009/0238488 A1 *   9/2009   Joon-Ki et al. ............... 382/264
2012/0170808 A1 *   7/2012   Ogata et al. ................... 382/103

FOREIGN PATENT DOCUMENTS

| JP | 3349060 B2 | 11/2002 |
| JP | 2003-99762 A | 4/2003 |
| WO | WO 2011036936 A1 * | 3/2011 |

* cited by examiner

*Primary Examiner* — Nirav G Patel
(74) *Attorney, Agent, or Firm* — McDermott Will & Emery LLP

(57) ABSTRACT

There are provided an environment recognition device and an environment recognition method. The environment recognition device obtains a luminance of each of a plurality of blocks formed by dividing a detection area; derives an edge direction based on a direction in which an edge of the luminance of each block extends; associates the blocks with each other based on the edge direction so as to generate an edge trajectory; groups a region enclosed by the plurality of edge trajectories as a target object; and determines the target object as a specific object.

5 Claims, 14 Drawing Sheets

⇩ SIMPLIFIED

FIG. 7A
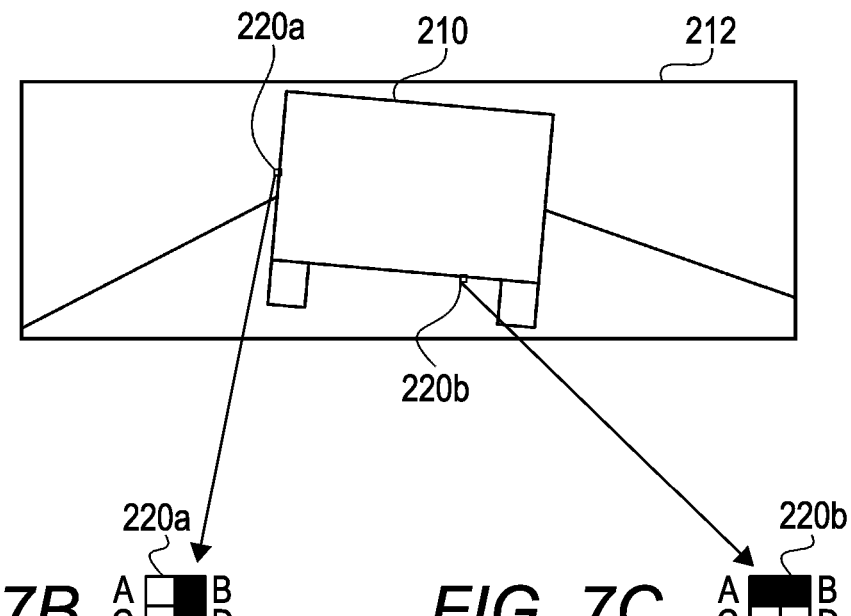
FIG. 7B 　　　FIG. 7C 
FIG. 7D 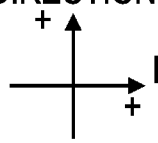　　　FIG. 7E 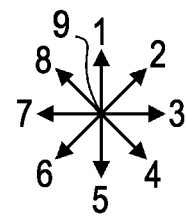
FIG. 7F　VERTICAL DIRECTION + / HORIZONTAL DIRECTION +
FIG. 7G FIG. 10A
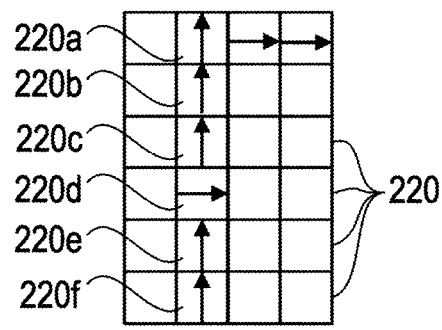
FIG. 10B
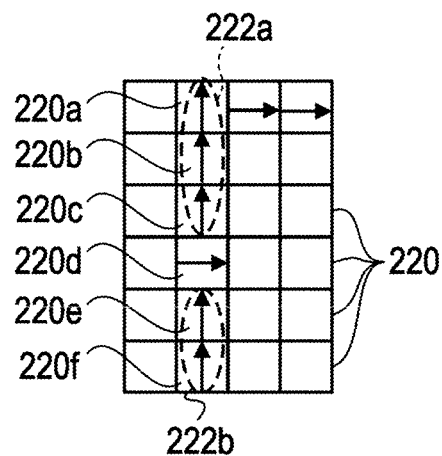
FIG. 10C
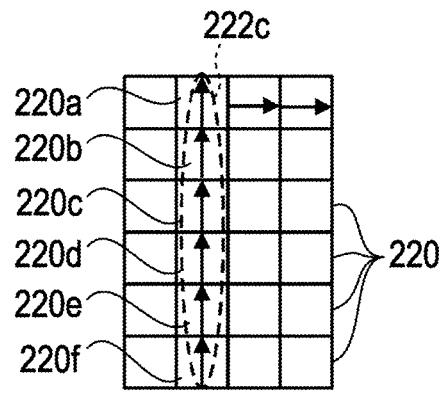

ENVIRONMENT RECOGNITION DEVICE AND ENVIRONMENT RECOGNITION METHOD

CROSS-REFERENCE TO RELATED APPLICATIONS

The present application claims priority from Japanese Patent Application No. 2011-111998 filed on May 19, 2011, the entire contents of which are hereby incorporated by reference.

BACKGROUND OF THE INVENTION

1. Field of the Invention

The present invention relates to an environment recognition device and an environment recognition method for recognizing a target object based on a luminance of the target object in a detection area.

2. Description of Related Art

Conventionally, a technique has been known that detects a target object such as an obstacle including a vehicle and a traffic light located in front of a subject vehicle for performing control to avoid collision with the detected target object and to maintain a safe distance between the subject vehicle and the preceding vehicle (for example, Japanese Patent No. 3349060 (Japanese Patent Application Laid-Open (JP-A) No. 10-283461)).

Further, in such techniques, there is a technique that specifies a target object uniformly as a solid object, but further determines whether the detected target object is a preceding vehicle that is running at the same speed as the subject vehicle or a fixed object that does not move. In this case, when the target object is detected by capturing an image of a detection area, it is necessary to extract (cut out) the target object from the captured image before specifying what the target object is.

For example, there is known a technique that extracts a pixel (edge pixel) having an edge from a captured image based on a derivative value between adjacent pixels, derives a histogram (distance distribution) of the edge pixel in the width direction and in the height direction of the image, and estimates a region corresponding to its peak as an edge of a target object. There is also disclosed a technique for determining whether a target object is a vehicle through a comparison between a fusion pattern based on a histogram and a dictionary pattern stored beforehand (e.g., JP-A No. 2003-99762).

However, in the conventional method of deriving the histogram in the horizontal direction and in the vertical direction, a preceding vehicle ahead of a subject vehicle is imaged relatively on a tilt, and its edge does not exactly extend in the width direction and in the height direction, when a road surface is inclined with respect to the advancing direction of the subject vehicle. Therefore, there is no peak in the histogram in the width direction and in the height direction, resulting in that the accuracy of detecting a vehicle is deteriorated. Similarly, the peak of the histogram in the width direction and in the height direction is difficult to appear in a vehicle having many curved surfaces, resulting in that such vehicle is difficult to be specified.

BRIEF SUMMARY OF THE INVENTION

The present invention is accomplished in view of the circumstance described above, and aims to provide an environment recognition device and an environment recognition method that can enhance the efficiency and accuracy of specifying a target object that tilts or that is has a curved shape.

In order to solve the above problems, an aspect of the present invention provides an environment recognition device that includes: a luminance obtaining unit that obtains a luminance of each block formed by dividing a detection area in a luminance image; an edge deriving unit that derives an edge direction based on a direction in which an edge depending on the luminance of each block extends; a trajectory generating unit that associate the blocks based on the edge direction so as to generate an edge trajectory; a grouping unit that groups regions enclosed by the edge trajectories as a target object; and a specific object determining unit that determines the target object as a specific object.

The edge deriving unit may derive the edge direction based on a difference between totals of the luminances in two left and right regions formed by dividing the block in a vertical direction, and a difference between totals of the luminances in two upper and lower regions formed by dividing the block in a horizontal direction.

When the absolute value of the difference between the totals of a direction is not more than a predetermined threshold value, the edge deriving unit may derive the edge direction without using the difference between the totals of the direction.

The predetermined threshold value may be obtained by an increasing function according to an average of all luminances in the block.

The trajectory generating unit may interpolate an edge direction of any block based on the edge direction of each block adjacent to the arbitrary block.

The environment recognition device may further include a region limiting unit that limits a region from which a luminance is to be obtained by the luminance obtaining unit to a region that includes an infinity point and is smaller than the detection area.

In order to solve the above problems, another aspect of the present invention provides an environment recognition method that includes: obtaining a luminance of each block formed by dividing a detection region in a luminance image; deriving an edge direction based on a direction in which an edge depending on the luminance of each block extends; associating the blocks based on the edge direction so as to generate an edge trajectory; grouping regions enclosed by the edge trajectories as a target object; and determining the target object as a specific object.

DETAILED DESCRIPTION OF THE INVENTION

FIGS. 7A and 7G are an explanatory diagram for explaining an operation of an edge deriving unit;

FIGS. 10A to 10C are explanatory diagrams for explaining an interpolation operation performed by the trajectory generating unit;

DETAILED DESCRIPTION OF THE INVENTION

Figure 1:
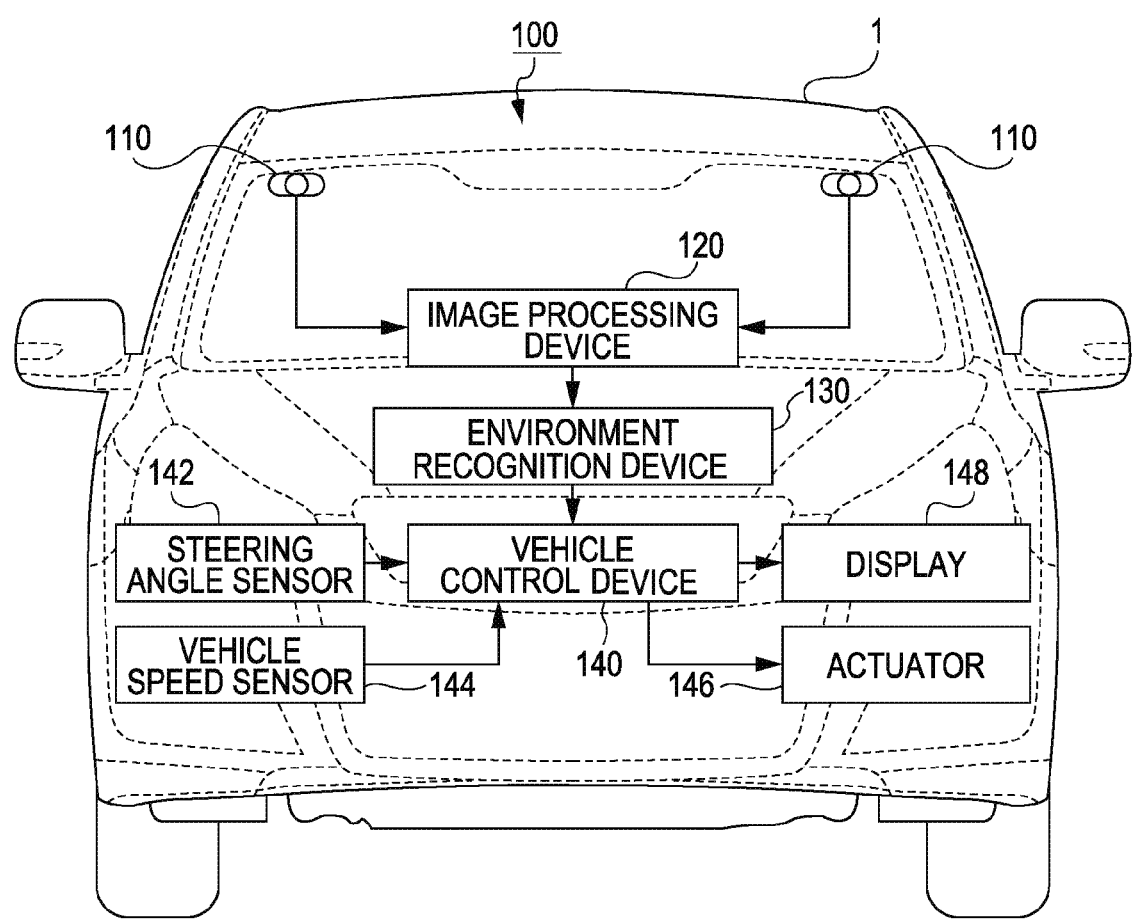
FIG. 1 is a block diagram illustrating a connection relationship in an environment recognition system.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related to the present invention are omitted in the drawings.

(Environment Recognition System 100)

FIG. 1 is a block diagram illustrating connection relationship in an environment recognition system 100. The environment recognition system 100 includes image capturing devices 110, an image processing device 120, an environment recognition device 130, and a vehicle control device 140 that are provided in a vehicle 1.

The image capturing devices 110 include an imaging element such as a CCD (Charge-Coupled Device) and a CMOS (Complementary Metal-Oxide Semiconductor), and can obtain a color image, that is, luminances of three color phases (red, green, blue) per pixel. In this case, a color image captured by the image capturing devices 110 is referred to as luminance image and is distinguished from a distance image to be explained later. The image capturing devices 110 are disposed to be spaced apart from each other in a substantially horizontal direction so that optical axes of the two image capturing devices 110 are substantially parallel in a proceeding direction of the vehicle 1. The image capturing device 110 continuously generates image data obtained by capturing an image of a target object existing in a detection area in front of the vehicle 1 at every 1/60 seconds (60 fps), for example. In this case, the target object may be not only an independent three-dimensional object such as a vehicle, a traffic light, a road, and a guardrail, but also an illuminating portion such as a tail lamp, a turn signal, a traffic light that can be specified as a portion of a three-dimensional object. Each later-described functional unit in the embodiment performs processing in response to the update of such image data.

The image processing device 120 obtains image data from each of the two image capturing devices 110, and derives, based on the two pieces of image data, parallax information including a parallax of any block (a set of a predetermined number of pixels) in the image and a position representing a position of the any block in the image. Specifically, the image processing device 120 derives a parallax using so-called pattern matching that searches a block in one of the image data corresponding to the block optionally extracted from the other image data. The block is, for example, an array including four pixels in the horizontal direction and four pixels in the vertical direction. In this embodiment, the horizontal direction means a horizontal direction for the captured image, and corresponds to the width direction in the real world. On the other hand, the vertical direction means a vertical direction for the captured image, and corresponds to the height direction in the real world.

One way of performing the pattern matching is to compare luminance values (Y color difference signals) between two image data by the block indicating any image position. Examples include an SAD (Sum of Absolute Difference) obtaining a difference of luminance values, an SSD (Sum of Squared intensity Difference) squaring a difference, and an NCC (Normalized Cross Correlation) adopting the degree of similarity of dispersion values obtained by subtracting a mean luminance value from a luminance value of each pixel. The image processing device 120 performs such parallax deriving processing on all the blocks appearing in the detection area (for example, 600 pixels×200 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived by the target object, but is independently derived by the resolution (for example, by the block) in the detection area. In this embodiment, an image obtained by associating the parallax information thus derived (corresponding to a later-described relative distance) with image data is referred to as a distance image.

Figure 2A:
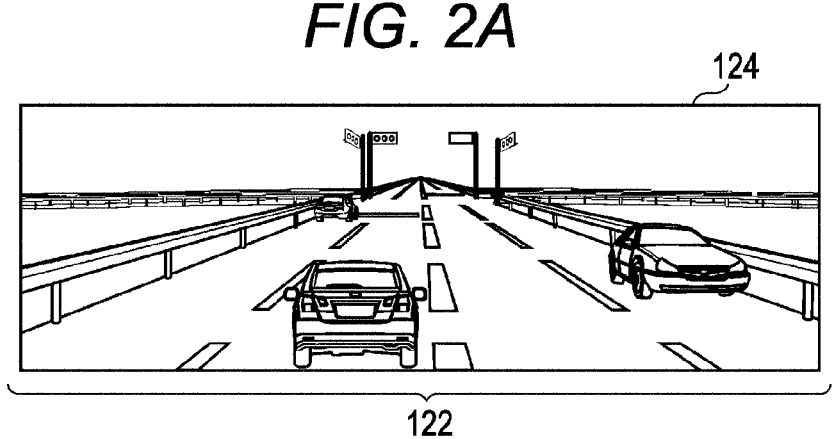
FIGS. 2A and 2B are explanatory diagrams for explaining a luminance image
Figure 2B:
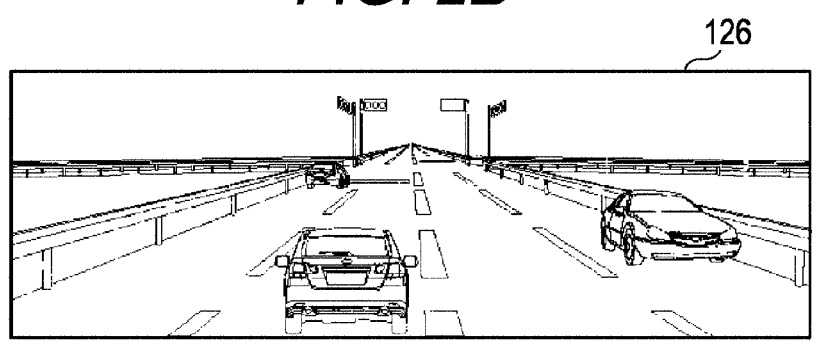

FIGS. 2A and 2B are explanatory diagrams for explaining a luminance image 124 and a distance image 126. For example, Assume that the luminance image (image data) 124 as shown in FIG. 2A is generated with regard to a detection area 122 by the two image capturing devices 110. Here, for the sake of easy understanding, only one of the two luminance images 124 is schematically shown. The image processing device 120 obtains a parallax for each block from such luminance image 124, and forms the distance image 126 as shown in FIG. 2B. Each block of the distance image 126 is associated with a parallax of the block. In the drawing, for the sake of explanation, a block from which a parallax is derived is indicated by a black dot.

The parallax can be easily specified at the edge portion (portion where there is contrast between adjacent pixels) of objects, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object.

The environment recognition device 130 obtains the luminance image 124 from the image processing device 120, and extract a target object in the detection area 122 based on an edge of the luminances in the luminance image 124 to determine a specific object the target object in the detection area corresponds to. The environment recognition device 130 also obtains the distance image from the image processing device 120 and, using a so-called stereo method, converts the parallax information for each block in the detection area 122 of the distance image 126 into three-dimensional position information including a relative distance. The stereo method is a method using a triangulation method to derive a relative distance of a target object with respect to the image capturing device 110 from the parallax of the target object. The environment recognition device 130 will be explained later in detail.

The vehicle control device 140 avoids a collision with the target object specified by the environment recognition device 130 and performs control so as to maintain a safe distance from the preceding vehicle. More specifically, the vehicle control device 140 obtains a current cruising state of the vehicle 1 based on, for example, a steering angle sensor 142 for detecting an angle of the steering and a vehicle speed sensor 144 for detecting a speed of the vehicle 1, thereby controlling an actuator 146 to maintain a safe distance from the preceding vehicle. The actuator 146 is an actuator for vehicle control used to control a brake, a throttle valve, a steering angle and the like. When collision with a target object is expected, the vehicle control device 140 displays a warning (notification) of the expected collision on a display 148 provided in front of a driver, and controls the actuator 146 to automatically decelerate the vehicle 1. The vehicle control device 140 can also be integrally implemented with the environment recognition device 130.

(Environment Recognition Device 130)

Figure 3:
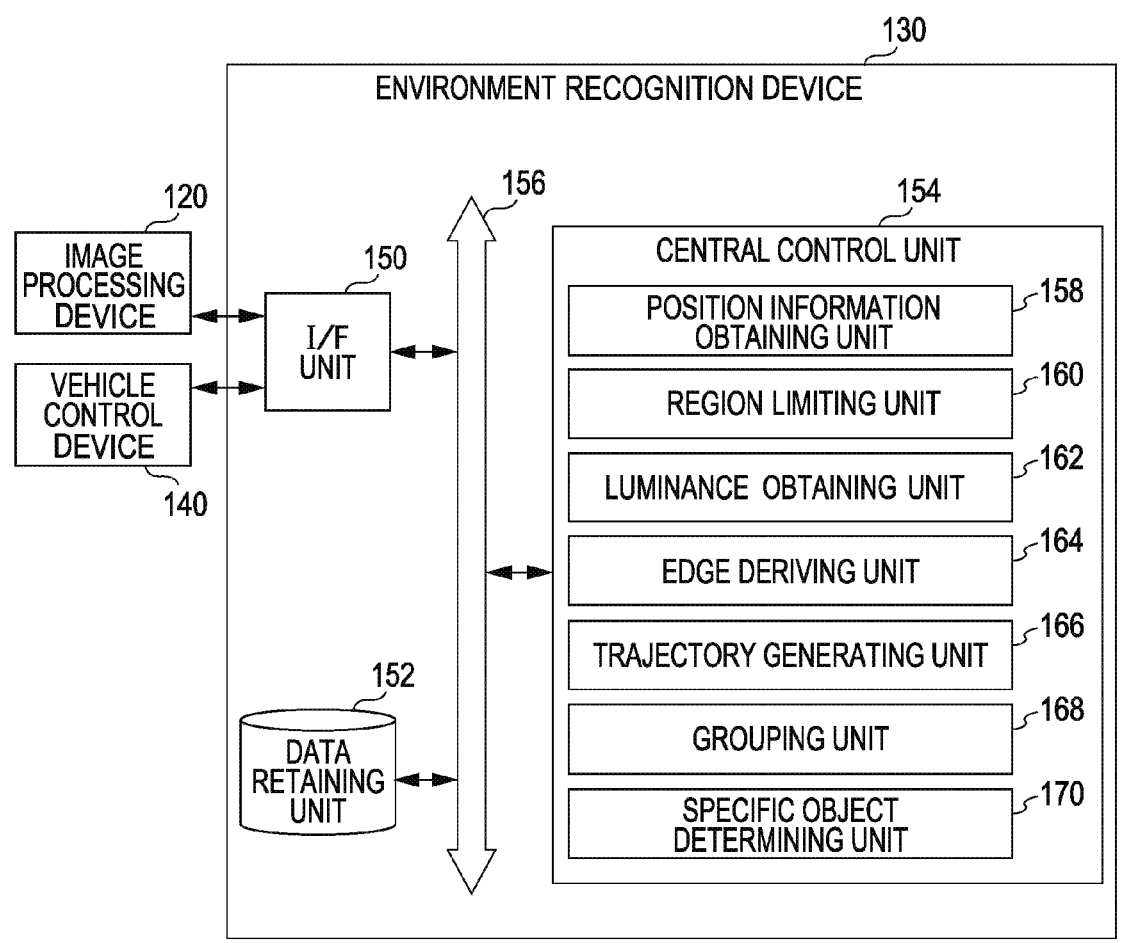
FIG. 3 is a functional block diagram schematically illustrating functions of an environment recognition device.

FIG. 3 is a functional block diagram schematically illustrating functions of an environment recognition device 130. As shown in FIG. 3, the environment recognition device 130 includes an I/F unit 150, a data retaining unit 152, and a central control unit 154.

The I/F unit 150 is an interface for interactive information exchange with the image processing device 120 and the vehicle control device 140. The data retaining unit 152 is constituted by a RAM, a flash memory, an HDD and the like, and retains a plurality of outline patterns used for pattern matching and various kinds of information required for processing performed by each functional unit explained below. In addition, the data retaining unit 152 temporarily retains the luminance image 124 received from the image processing device 120.

The central control unit 154 is comprised of a semiconductor integrated circuit including, for example, a central processing unit (CPU), a ROM storing a program and the like, and a RAM serving as a work area, and controls the I/F unit 150 and the data retaining unit 152 through a system bus 156. In the present embodiment, the central control unit 154 also functions as a position information obtaining unit 158, a region limiting unit 160, a luminance obtaining unit 162, an edge deriving unit 164, a trajectory generating unit 166, a grouping unit 168, and a specific object determining unit 170.

The position information obtaining unit 158 uses the stereo method to convert parallax information for each block in the detection area 122 of the distance image 126 into three-dimensional position information including the width direction x, the height direction y, and the depth direction z. The parallax information represents a parallax of each target portion in the distance image 126, whereas the three-dimensional position information represents information about the relative distance of each target portion in the real world. When the parallax information is not derived by the pixel but is derived by the block, that is, a calculation may be executed in units of pixels with the parallax information being deemed as parallax information about all the pixels which belong to a block.

Figure 4:
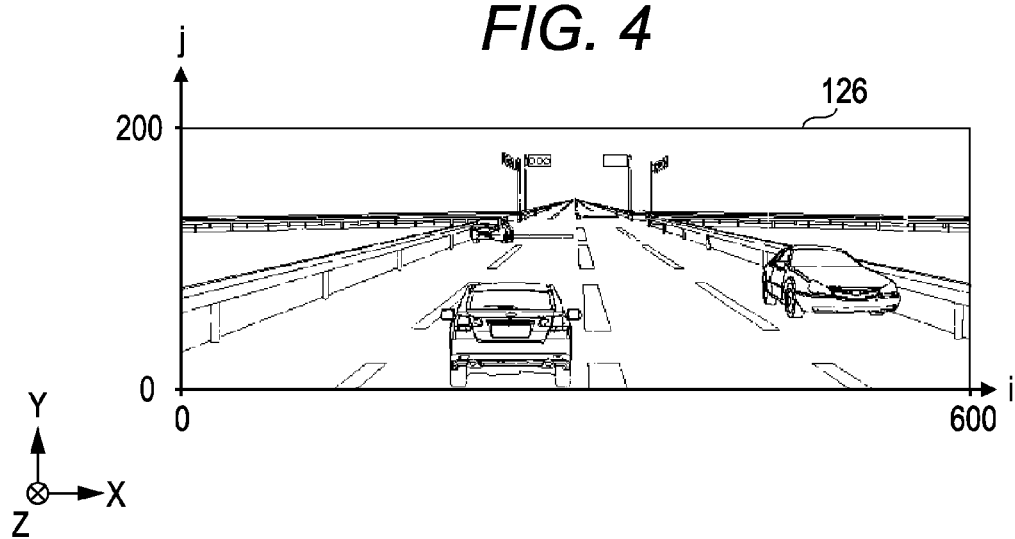
FIG. 4 is an explanatory diagram for explaining conversion into three-dimensional position information performed by a position information obtaining unit.

FIG. 4 is an explanatory diagram for explaining conversion into three-dimensional position information by the position information obtaining unit 158. First, the position information obtaining unit 158 treats the distance image 126 as a coordinate system in a pixel unit as shown in FIG. 4. In FIG. 4, the lower left corner is adopted as an origin (0, 0). The horizontal direction is adopted as an i coordinate axis, and the vertical direction is adopted as a j coordinate axis. Therefore, a pixel having a parallax dp can be represented as (i, j, dp) using a pixel position i, j and the parallax dp.

The three-dimensional coordinate system in the real world according to the present embodiment will be considered using a relative coordinate system in which the vehicle 1 is located in the center. The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and a vertical line passing through the center of two image capturing devices 110 is denoted as an origin (0, 0, 0). When the road is assumed to be a flat plane, the road surface matches the X-Z plane (y=0). The position information obtaining unit 158 uses (formula 1) to (formula 3) shown below to transform the coordinate of the pixel (i, j, dp) in the distance image 126 into a three-dimensional point (x, y, z) in the real world.

$$x = CD/2 + z \cdot PW \cdot (i - IV) \quad \text{(formula 1)}$$

$$y = CH + z \cdot PW \cdot (j - JV) \quad \text{(formula 2)}$$

$$z = KS/dp \quad \text{(formula 3)}$$

Here, CD denotes an interval (baseline length) between the image capturing devices 110, PW denotes a corresponding distance in the real world to a distance between adjacent pixels in the image, so-called like an angle of view per pixel, CH denotes an disposed height of the image capturing device 110 from the road surface, IV and JV denote coordinates (pixels) in the image at an infinity point in front of the vehicle 1, and KS denotes a distance coefficient (KS=CD/PW).

Accordingly, the position information obtaining unit 158 derives the height from the road surface on the basis of the relative distance of the target portion and the detection distance in the distance image 126 between a point on the road surface located at the same relative distance as the target portion and the target portion.

The region limiting unit 160 limits a region from which the later-described luminance obtaining unit 162 obtains luminances to a region that is smaller than the detection area 122 and includes an infinity point.

Figure 5A:
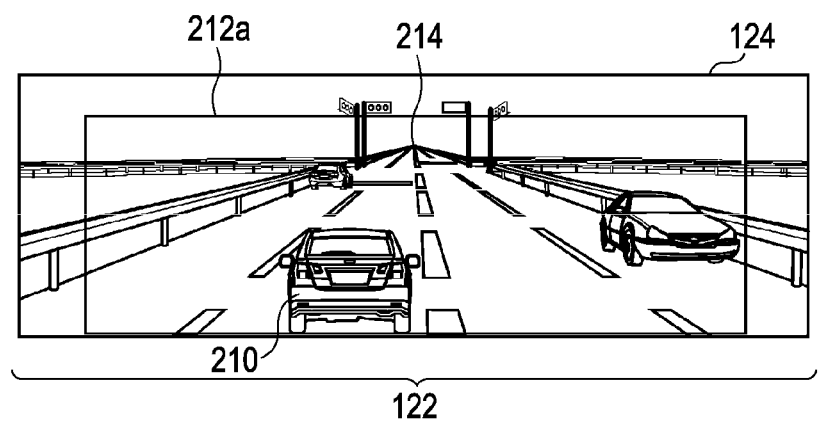
FIGS. 5A and 5B are explanatory diagrams for explaining an operation of a region limiting unit.
Figure 5B:
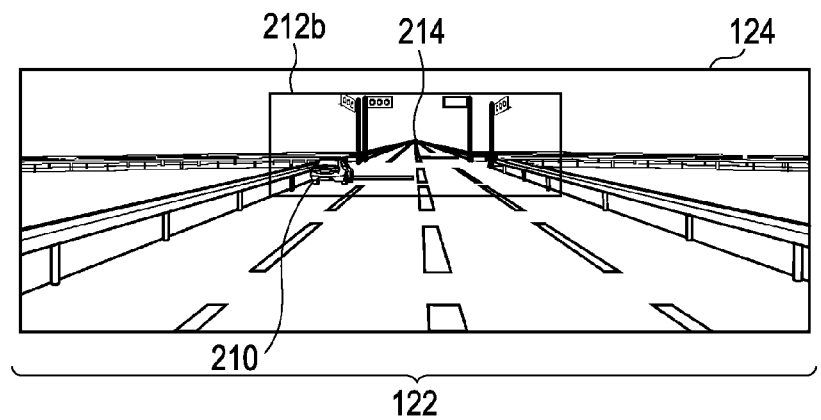

FIGS. 5A and 5B are explanatory diagrams for explaining an operation of the region limiting unit 160. When a relative distance from a preceding vehicle 210 obtained by the position information obtaining unit 158 is short as illustrated in FIG. 5A, the region limiting unit 160 sets a region 212a for obtaining luminances to be large in order to properly extract the preceding vehicle 210. When the relative distance from the vehicle preceding 210 is long as illustrated in FIG. 5B, the region limiting unit 160 sets a region 212b for obtaining luminances to be small so as to extract only the preceding vehicle 210. Both of the regions 212a and 212b include an infinity point 214, and are defined according to the relative distance to the preceding vehicle 210, such that they radiate wider as the relative distance is shorter. Since the region 212 (212a or 212b) for obtaining luminances is set according to the relative distance from the preceding vehicle 210, it is possible to avoid unnecessary luminances from being obtained, whereby a calculation load can be reduced.

The luminance obtaining unit 162 obtains luminances by the block (2×2 pixels in the present embodiment) (luminances of three color phases (red, green, and blue) per pixel)

from the region 212a or 212b limited by the region limiting unit 160 in the received luminance image 124. At this time, when it is, for example, rainy or cloudy in the detection area, the luminance obtaining unit 162 may obtain the luminances after adjusting white balance.

Figure 6A:
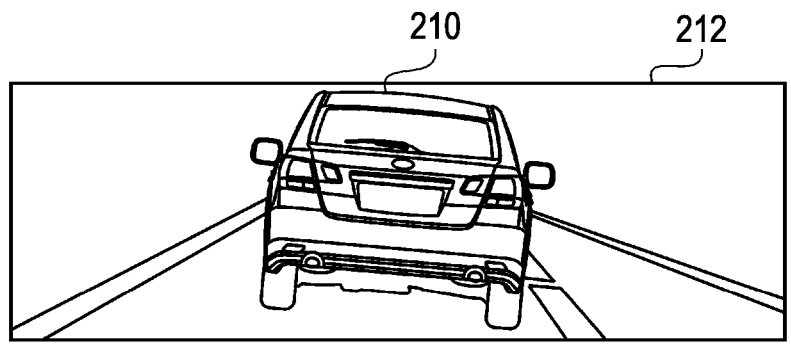
FIGS. 6A and 6B are explanatory diagrams for explaining a luminance image used in an embodiment of the present invention.
Figure 6B:
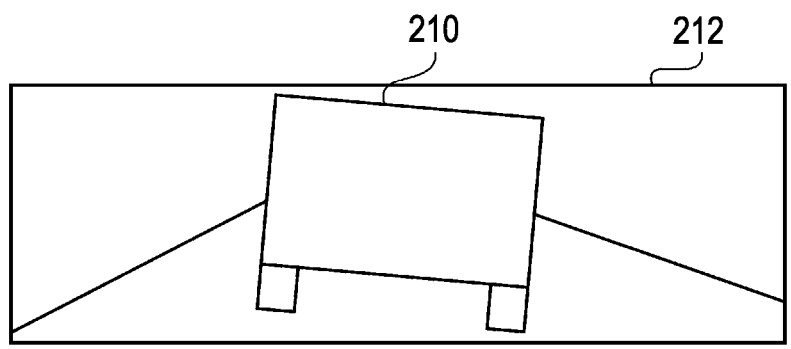

In the present embodiment, an edge of the luminances obtained by the luminance obtaining unit 162 is effectively utilized to extract a target object. This is in order to maintain the accuracy of specifying a target object even when a road surface is inclined with respect to the advancing direction of the vehicle 1 as illustrated in FIG. 6A, whereby an image of the preceding vehicle 210 is captured relatively on a tilt, and its edge does not extend in the horizontal direction and in the vertical direction For the sake of convenience of description, the description below uses FIG. 6B that is a simplified outline of the preceding vehicle 210 in the limited region 212 in FIG. 6A.

The edge deriving unit 164 derives an edge direction based on a direction in which the edge of the luminances of each block extends. Specifically, the edge deriving unit 164 derives the edge direction based on a difference between totals of the luminances in two left and right regions that are formed by dividing a block (here, 2×2 pixels) in the vertical direction (hereinafter merely referred to as a horizontal-direction component), and a difference between totals of the luminances in two upper and lower regions that are formed by dividing the block in the horizontal direction (hereinafter merely referred to as a vertical-direction component).

FIGS. 7A and 7G are an explanatory diagram for explaining an operation of an edge deriving unit 164. FIG. 7A illustrates the simplified preceding vehicle 210 in the limited region 212 illustrated FIG. 6B. It is assumed that a luminance distribution in FIG. 7(b) is obtained by enlarging any block 220a in the region 212, whereas a luminance distribution in FIG. 7(c) is obtained by enlarging any another block 220b. It is also assumed that in FIG. 7B the luminance range is set to 0 to 255, a white-out area corresponds to luminance "200", and a black-out area corresponds to luminance "0". In the present description, the luminance of the upper-left pixel of the block is expressed as A, the luminance of the upper-right pixel is expressed as B, the luminance of the lower-left pixel is expressed as C, and the luminance of the lower-right pixel is expressed as D. Furthermore the horizontal-direction component of the edge direction is defined as (A+B)−(C+D), and the vertical-direction component of the edge direction is defined as (A+C)−(B+D).

Accordingly, the horizontal-direction component of the edge direction of the block 220a illustrated in FIG. 7B is calculated as (A+B)−(C+D)=(200+0)−(200+0)=0, while the vertical-direction component of the edge direction thereof is calculated as (A+C)−(B+D)=(200+200)−(0+0)=+400. Since the horizontal-direction component is "0", and the vertical-direction component is "+400", the edge direction is indicated by an upward pointing arrow in the vertical direction as illustrated in FIG. 7D. It is to be rioted that the horizontal-direction component is defined such that the component in the right in the image is positive, while the vertical-direction component is defined such that the upper direction on the image is positive, as illustrated in FIG. 7F.

Similarly, the horizontal-direction component of the edge direction of the block 220b illustrated in FIG. 7C is calculated as (A+B)−(C+D)=(0+0)−(200+200)=−400, while the vertical-direction component of the edge direction thereof is calculated as (A+C)−(B+D)=(0+200)−(0+200)=0. Since the horizontal-direction component is "−400", and the vertical-direction component is "0", the edge direction is indicated by a leftward pointing arrow in the horizontal direction as illustrated in FIG. 7E.

The configuration described above in which a half region is subtracted from the other half region in the block can eliminate offset and noise of the luminance included in the entire block can be eliminated, whereby the edge can properly be extracted. The edge direction can be derived with a simple calculation using only addition and subtraction, whereby the calculation load is light.

The present embodiment aims to determine the similarity between adjacent blocks in the thus-derived edge direction in order to associate these blocks with each other. However, in the case where the derived value of the horizontal-direction component or the derived value of the vertical-direction component is simply used as the edge direction, there are a limitless number of variations in the edge direction. Then, it is necessary to set for the limitless number of the variations an edge direction range in which variations may be regarded as same. Therefore, in the present embodiment, the horizontal-direction component and the vertical-direction component are defined with a unit of length so as to simplify variations in the edge direction. Specifically, the horizontal-direction component and the vertical-direction component can both be regarded as any one of −1, 0, and +1. In so doing, the edge direction can be limited to 9 states that include 8 directions by 45 degrees each and a state with no direction where the horizontal-direction component and the vertical-direction component are both 0, as illustrated in FIG. 7G. This configuration can dramatically reduce the calculation load of the later-described trajectory generating unit 166.

A number attached to each direction in FIG. 7G indicates an order of priority (in ascending sequence) for each edge direction. When a plurality of edge directions can be selected for one block 220, the edge direction with the highest priority is defined as the edge direction of the block 220.

According to such simplified derivation, all cases in which the horizontal-direction components and vertical-direction components that are not 0 have a unit length. For example, although the difference in the luminance is only 2 between the case where the horizontal-direction component is −1 in terms of luminance and the case where the horizontal-direction component is +1 in terms of luminance, the opposite result is generated as the edge direction.

In view of this, a dead zone is formed for deriving the edge direction. If an absolute value of the horizontal-direction component or the vertical-direction component is not more than a threshold value (for example, 20), the edge deriving unit 164 derives the edge direction, regarding the horizontal-direction component and the vertical-direction component as 0. This can avoid the edge direction from being unstable due to a horizontal-direction component or a vertical-direction component that are caused as noise, whereby the later-described trajectory generating unit 166 can stably obtain a valid result.

In the present embodiment, a fixed value is used as the predetermined threshold value. However, the predetermined threshold value may be variable. For example, the image capturing device 110 has a characteristic that the amount of noise increases as the luminance is higher. Therefore, the predetermined threshold value is preferably obtained by an increasing function according to the luminance in the block, for example, an average of all luminance in the block (for example, a linear function with the average of luminances being defined as an argument). This can avoid the edge direction from becoming unstable due to noise, regardless of the fluctuation in the noise amount according to whether the overall luminance in the block is high or low. When the overall luminance is high, the predetermined threshold value is also set to be high. However, this is not a problem for the stable derivation of the edge direction, because the horizontal-direction component and the vertical-direction component also increase in the a high luminance range.

Figure 8:
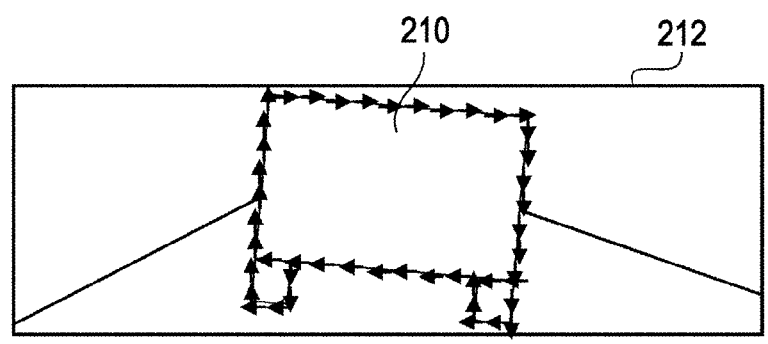
FIG. 8 is a conceptual diagram illustrating the case where an edge direction is derived by the edge deriving unit.

FIG. 8 is a conceptual diagram illustrating the case where an edge direction is derived by the edge deriving unit 164. The edge directions (indicated by arrows in FIG. 8) are derived along portions corresponding to the outline of the preceding vehicle 210 in FIG. 7A. For easy understanding, the edge directions are abstractly illustrated to be large. However, the edge direction is actually derived for each block.

In the present embodiment, a same edge direction is derived for each side of the outline. However, depending upon the image capturing condition, the edge might be doubly detected on close positions, or the edge might not be detected partially. When the edge is doubly detected on close positions, one edge direction is determined based on the order of priority in FIG. 7G. When the edge cannot be detected partially, the later-described trajectory generating unit 166 performs interpolation for the block.

Figure 9:
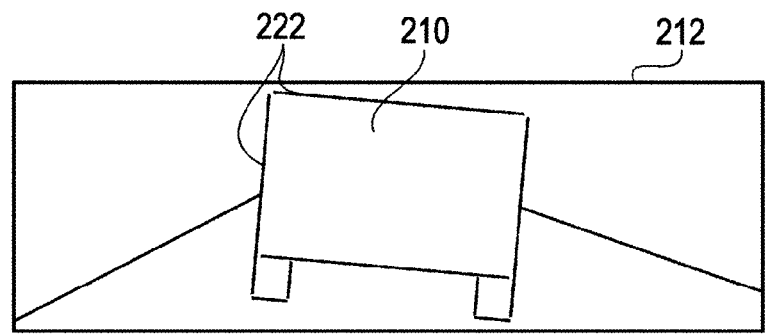
FIG. 9 is an explanatory diagram for explaining an operation of a trajectory generating unit.

The trajectory generating unit 166 associates blocks with each other based on an edge direction derived by the edge deriving unit 164, thereby generating an edge trajectory. Specifically, the trajectory generating unit 166 compares adjacent blocks. When they have a same edge direction, the trajectory generating unit 166 associates the blocks with each other. As a result, an edge trajectory 222 representing the outline of the preceding vehicle 210 is formed as illustrated in FIG. 9. In the present embodiment, a histogram (distance distribution) of the edge pixels in the horizontal direction or in the vertical direction is not derived, but the trajectory formed by the edge is focused. Therefore, even if the direction in which the edge extends tilts with respect to the horizontal direction or the vertical direction, or even if the edge has a curvature, the trajectory of the edge can be appropriately derived.

The outer appearance of the target object can almost be reproduced by generating the edge trajectory 222 as described above. However, the edge might partially be different or the edge might be lost due to environment light such as solar light or illumination light or due to fog or stain on a front window. In view of this, the trajectory generating unit 166 interpolates an edge direction of an arbitrary block based on the edge direction of a plurality of blocks adjacent to the arbitrary block. Specifically, when two edge trajectories 222 adjacent to the arbitrary block have the same edge direction, the trajectory generating unit 166 rewrites the edge direction of two edge trajectories 222 on the edge direction of the arbitrary block, thereby forming one long edge trajectory including the arbitrary block.

FIGS. 10A to 10C are explanatory diagrams for explaining an interpolation operation performed by the trajectory generating unit 166. For example, it is assumed that the edge deriving unit 164 derives edge directions illustrated in FIG. 10A in the plurality of blocks 220 (220a to 220f) disposed illustrated in FIG. 10A. In the drawing the block 220d has no continuity with the other blocks 220a, 220b, 220c, 220e, and 220f for some reason.

Since the edge directions of the blocks 220a, 220b, and 220c are same in FIG. 10A, the trajectory generating unit 166 associates these three blocks 220a, 220b, and 220c to generate an edge trajectory 222a as illustrated in FIG. 10B. Further, since the edge directions of the blocks 220e and 220f are same, the trajectory generating unit 166 associates these two blocks 220e and 220f to generate an edge trajectory 222b as illustrated in FIG. 10B.

Then, the trajectory generating unit 166 searches for blocks adjacent to the block 220d, which is not used for generating the edge trajectory 222, and determines whether there is a plurality of edge trajectories 222. When there is a plurality of edge trajectories (for example, the edge trajectories 222a and 222b), and the plurality of edge trajectories 222 has a same edge direction (for example, upward direction on the image), the trajectory generating unit 166 changes the edge direction of the block 220d to the edge direction same as that of the edge trajectories 222a and 222b, as illustrated in FIG. 10C. The trajectory generating unit 166 then newly generates a series of edge trajectory 222c including the block 220d.

When there are two types of edge trajectories (two types of edge directions) for one of the blocks 220, only one edge direction may be selected according to the order of priority illustrated in FIG. 7G. The case where there two types of edge trajectories means, for example, the case in which there is an edge trajectory 222 having a same edge direction on the blocks above and below one of the blocks 220, and there is an edge trajectory 222 having an edge direction, different from the edge direction of the blocks above and below the one of the blocks 220 on the blocks at the right and at the left of the one of the blocks 220.

In the present embodiment, the interpolation of the edge direction is executed by using only the edge direction. However, the trajectory generating unit 166 may be configured to determine whether or not the interpolation should be executed in consideration of a parameter involved with a difference value (edge intensity) of the totals of the luminances corresponding to the horizontal-direction component or the vertical-direction component in one of the above-mentioned blocks 220, for example. With such a configuration, not only the continuity in the edge direction but also the continuity in the edge intensity can be determined for a block or for an edge direction, whereby a highly-precise interpolation can be realized.

The grouping unit 168 groups regions enclosed by a plurality of edge trajectories 222 as a target object.

Figure 11:
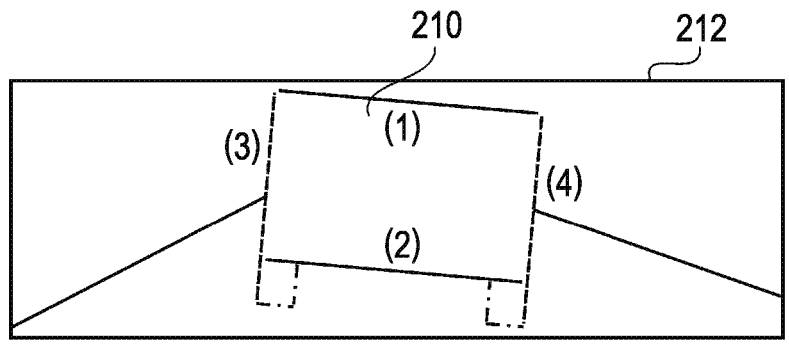
FIG. 11 is an explanatory diagram for explaining an operation of a grouping unit.

FIG. 11 is an explanatory diagram for explaining an operation 168. The grouping unit 168 extracts edge trajectories 222 from a limited region 212, and combines opposing edge trajectories 222. For example, the grouping unit 168 combines an edge trajectory (1) and an edge trajectory (2) indicated by a solid line in FIG. 11, and combines an edge trajectory (3) and an edge trajectory (4) indicated by a broken line. The grouping unit 168 defines a region included in the opposing edge trajectories 222 as a target object. Accordingly, in this case, a rectangular target object defined by the parallel edge trajectories (1) and (2) and the parallel edge trajectories (3) and (4) is extracted.

Opposing edge trajectories are determined to be parallel when the slopes of the approximated curves (approximated straight lines) of the edge trajectories 222 are same, or when the length of a segment vertical to the edge trajectory in the edge trajectories 222 is constant in any cases.

When the grouping unit 168 determines that the grouped target object tilts with respect to the horizontal direction, it may perform an affine transformation to the target object to convert the coordinates thereof for later-described pattern matching. An angle of any one of the edge trajectories 222 from a horizontal line or from a vertical line may be used as the conversion angle employed for the affine transformation. When there is a plurality of edge trajectories 222, angles from the horizontal line or from the vertical line may be calculated for a plurality of or all edge trajectories 222, and the average thereof may be calculated. This can enhance the precision of the coordinate conversion by the affine transformation.

When a target object made as a result of grouping processing by the grouping unit 168 satisfy a predetermined condition, the specific object determining unit 170 determines that the target object is a specific object. The pattern matching is employed as the condition in the present embodiment.

The specific object determining unit 170 firstly reads the target object and patterns retained in the data retaining unit 152, for example, typical outline patterns of a vehicle, and performs pattern matching between the target object and the outline patterns. Various methods such as the above-mentioned SAD, SSD, or NCC can be employed as the pattern matching.

In the present embodiment, since the target object is present on a driving lane on which the vehicle 1 runs, there is the case where the target object can be estimated as a vehicle on the driving lane. For example, when the target object on the driving lane can be approximated with a rectangle, and the ratio of the lengths in the horizontal direction and the length in the vertical direction is included a range by which the target object can most probably be regarded as a vehicle, such as 3:1 to 1:2, the target object may be determined to be a vehicle without performing the pattern matching.

While the above description uses a vehicle as an example, the present embodiment can be identify various other specific objects such as a human, a traffic light, or a road sign. For example, since the edge trajectory in the present embodiment can be applied to curves, the present embodiment can be applied to a target object often represented by a curve such as a shape of a human.

As a result, the environment recognition device 130 can extract, from the luminance image 124, one or more target objects as specific objects, and the information can be used for various kinds of control. For example, the environment recognition device 130 can specify the target object in FIG. 11 as a specific object "vehicle". Accordingly, the vehicle 1 can determine whether or not it should be stop or decelerate according to the speed of the vehicle 1 and the relative distance from the specific object "vehicle".

The environment recognition device 130 specifies a target object based on a edge direction in the above-described manner, whereby it can enhance the efficiency and accuracy of specifying a target object that tilts or that has a curved shape.

(Environment Recognition Method)

Figure 12:
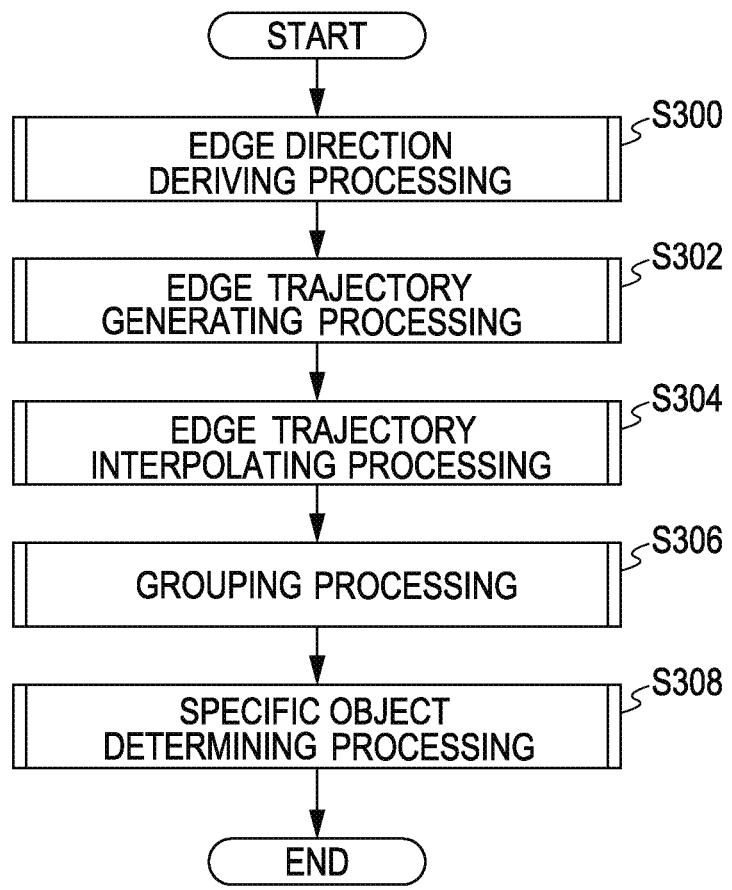
FIG. 12 is a flowchart illustrating an overall flow of an environment recognition method.

Hereinafter, the particular processings performed by the environment recognition device 130 will be explained based on the flowchart shown in FIGS. 12 to 17. FIG. 12 illustrates an overall flow of interrupt processing when the image processing device 120 transmits the distance image (parallax information) 126. FIGS. 13 to 17 illustrate subroutines therein. As a block, 2×2 pixels are employed, and the lower left corner of the luminance image 124 having 600×200 pixels is used as an origin. The processing is performed according to the environment recognition method in a range of 1 to 300 blocks in the horizontal direction of the image and 1 to 100 blocks in the vertical direction of the image.

As shown in FIG. 12, when an interrupt occurs according to the environment recognition method in response to reception of the luminance image 124, the luminance image 124 obtained from the image processing device 120 is referred to, whereby the edge direction of each block is derived in the region 212 limited by the region limiting unit 160 (S300). The blocks are associated with each other based on the derived edge directions so as to generate edge trajectories (S302), and the edge direction for blocks between edge trajectories are interpolated (S304).

The regions enclosed by the edge trajectories are grouped to extract a target object (S306), and then, the target object is determined as a specific object through the pattern matching (S308). The above-mentioned processings will specifically be described below.

(Edge Direction Deriving Processing S300)

Figure 13:
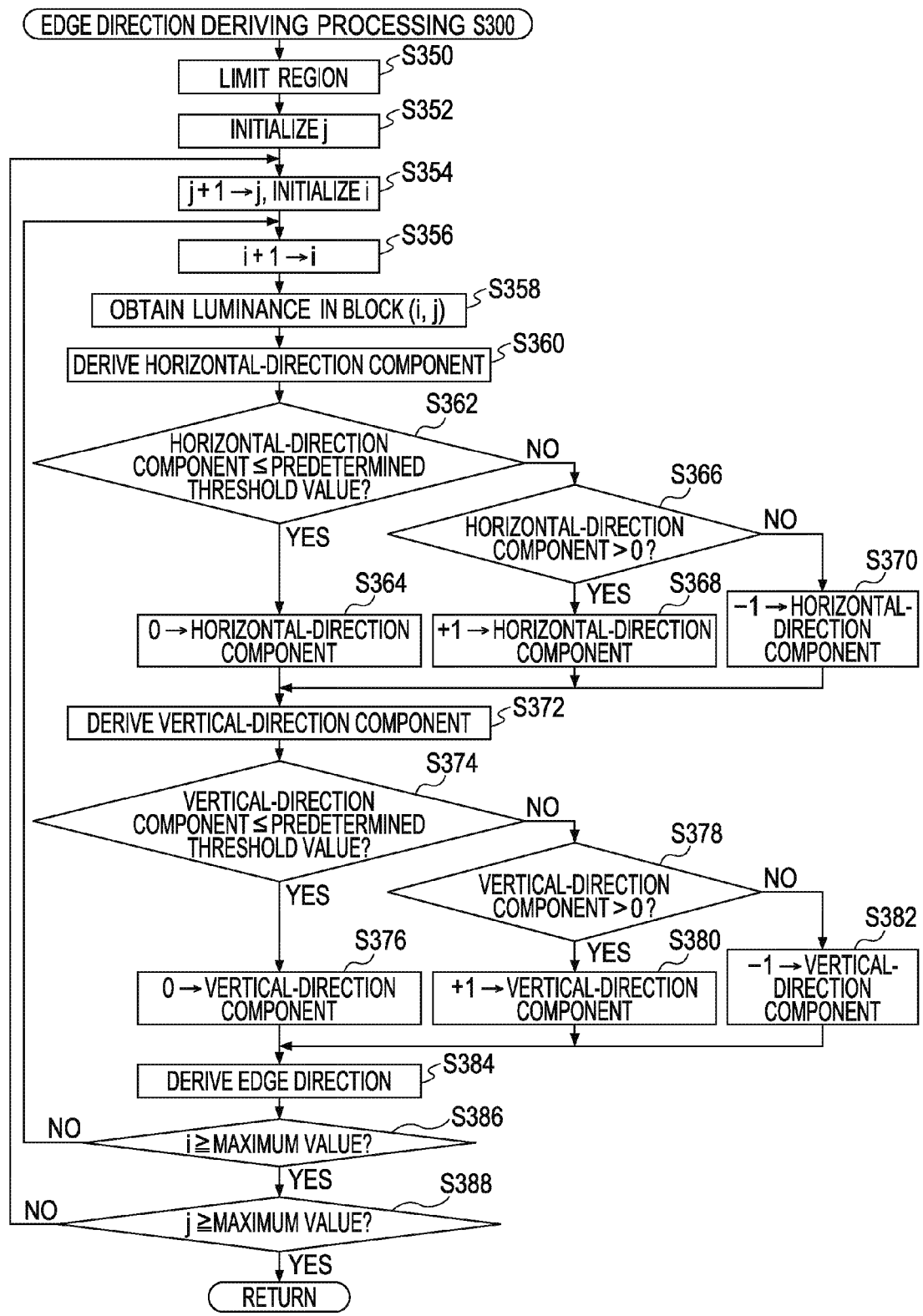
FIG. 13 is a flowchart illustrating a flow of edge direction deriving processing.

Referring to FIG. 13, the region limiting unit 160 firstly limits regions from which luminances are to be obtained (S350). It is assumed that the region from which the luminance is to be obtained is limited to the region 212 having 51 to 250 blocks in the horizontal direction and 21 to 80 blocks in the vertical direction of the image. The edge deriving unit 164 initializes (in the present embodiment, substitutes "20" to) a vertical variable j that for specifying a block (S352). Next, the edge deriving unit 164 adds "1" to (increments by 1) the vertical variable j, and initializes (in the present embodiment, substitutes "50" to) a horizontal variable i (S354). The edge deriving unit 164 then adds "1" to the horizontal variable i (S356). The horizontal variable i and the vertical variable j are provided to execute the edge direction deriving processing on all the blocks of 200 (51 to 250)×60 (21 to 80).

The edge deriving unit 164 causes the luminance acquiring unit 162 to obtain the luminance of a 2×2 pixels in the block (i, j) as a target portion from the luminance image 124 (S358).

The edge deriving unit 164 derives the horizontal-direction component based on the expression of (A+B)−(C+D) (S360), and determines whether or not the absolute value of the derived horizontal-direction component is not more than a predetermined threshold value (S362). If the absolute value of the horizontal-direction component is not more than the predetermined threshold value (YES in S362), the edge deriving unit 164 assigns 0 to the horizontal-direction component (S364). If the absolute value of the horizontal-direction component exceeds the predetermined threshold value (NO in S362), the edge deriving unit 164 determines whether or not the sign of the horizontal-direction component is positive (S366). If it is positive (YES in S366), the edge deriving unit 164 assigns +1 to the horizontal-direction component (S368). If it is not positive (NO in S366), the edge deriving unit 164 assigns −1 to the horizontal-direction component (S370).

Similarly, the edge deriving unit 164 derives the vertical-direction component based on the expression of (A+C)−(B+D) (S372), and determines whether or not the absolute value of the derived vertical-direction component is not more than a predetermined threshold value (S374). If the absolute value of the vertical-direction component is not more than the predetermined threshold value (YES in S374), the edge deriving unit 164 assigns 0 to the vertical-direction component (S376). If the absolute value of the vertical-direction component exceeds the predetermined threshold value (NO in S374), the edge deriving unit 164 determines whether or not the sign of the vertical-direction component is positive (S378). If it is positive (YES in S378), the edge deriving unit 164 assigns +1 to the vertical-direction component (S380). If it is not positive (NO in S378), the edge deriving unit 164 assigns −1 to the vertical-direction component (S382).

The edge deriving unit 164 then derives the edge direction from the horizontal-direction component and the vertical-direction component, and assigns an edge direction identifier d (for example, one of the numbers illustrated in FIG. 7G) indicating the edge direction to the block, thereby defining the block as (i, j, d) (S384).

Next, the edge deriving unit 164 determines whether the horizontal variable i exceeds the maximum value (250 in the present embodiment) of the horizontal block (S386). When the horizontal variable i does not exceed the maximum value (NO in S386), the processings are repeated from the increment processing of the horizontal variable i in step S356. If the horizontal variable i exceeds the maximum value (YES in S386), the edge deriving unit 164 determines whether the vertical variable j exceeds the maximum value (80 in the present embodiment) of the vertical block (S388). When the vertical variable j does not exceed the maximum value (NO in S388), the processings are repeated from the increment processing of the vertical variable j in step S354. When the vertical variable j exceeds the maximum value (YES in S388), the edge direction deriving processing is terminated. In this manner, the edge direction is assigned to each block.

(Edge Trajectory Generating Processing S302)

Figure 14:
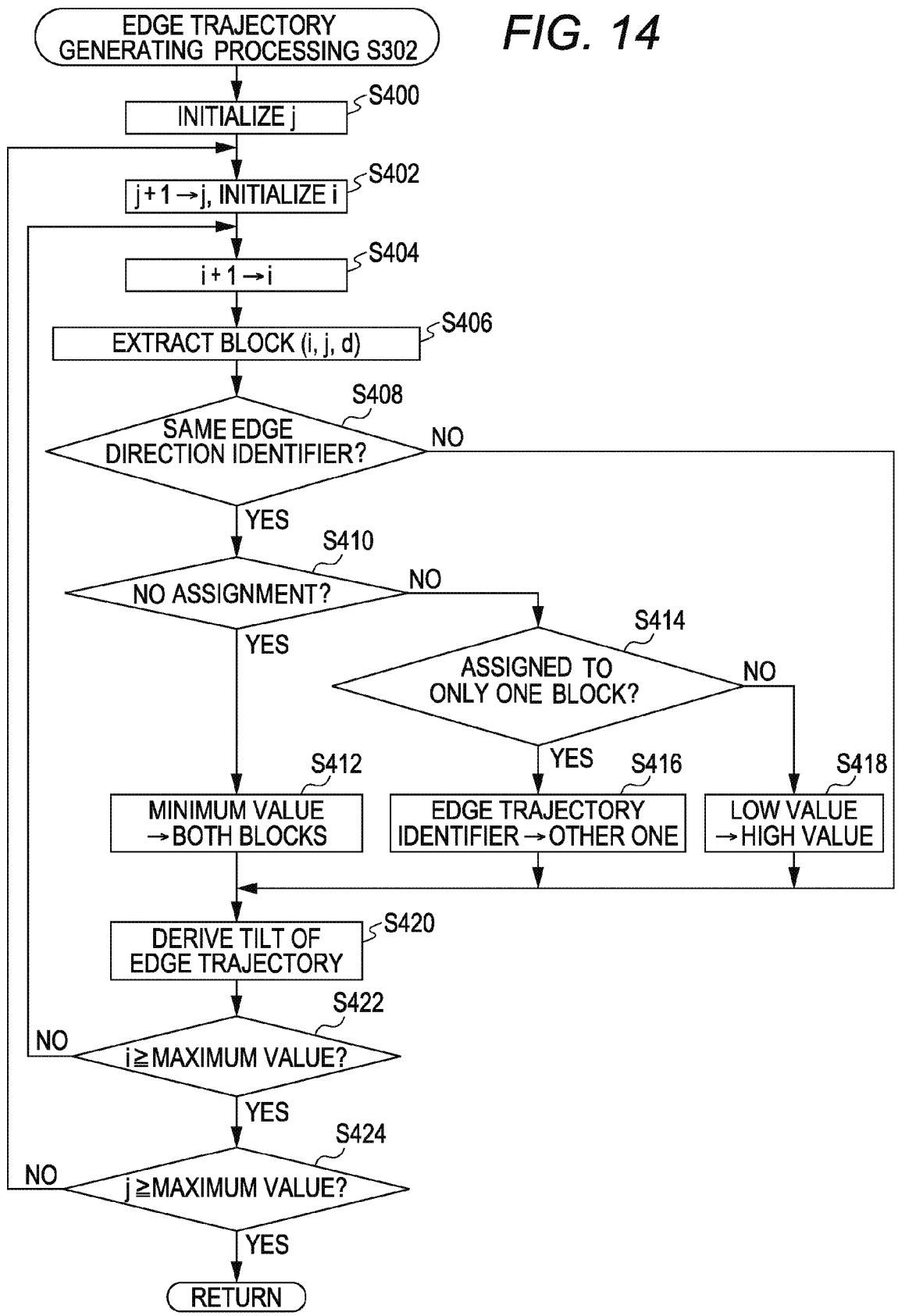
FIG. 14 is a flowchart illustrating a flow of edge trajectory generating processing.

As shown in FIG. 14, the trajectory generating unit 166 initializes (in the present embodiment, substitutes "20" to) the vertical variable j for specifying a target portion (block) (S400). The trajectory generating unit 166 then adds "1" to the vertical variable j, and initializes (in the present embodiment, substitutes "50" to) the horizontal variable i (S402). Then, the trajectory generating unit 166 adds "1" to the horizontal variable i (S404).

Next, the trajectory generating unit 166 extracts the block (i, j, d) (S406), and determines whether or not there is a block with the same edge direction identifier d out of the blocks adjacent to the extracted block (S408). If there is no block with the same edge direction identifier d (NO in S408), the processing in step S420 subsequent thereto is performed. On the other hand, if there is a block with the same edge direction identifier d (YES in S408), the trajectory generating unit 166 determines whether or not an edge trajectory identifier t is not assigned to with any block (S410). If the edge trajectory identifier t is not assigned to any blocks (YES in S410), the trajectory generating unit 166 associates the smallest value of the numbers that are not yet used as the edge trajectory identifier t to both blocks so as to expressed as (i, j, d, t) (S412).

If the edge trajectory identifier t is assigned to at least either one of the blocks (NO in S410), the trajectory generating unit 166 determines whether or not the edge trajectory identifier t is assigned to only either one of them (S414). If the edge trajectory identifier t is assigned to only either one of the blocks (YES in S414), the trajectory generating unit 166 assigns the edge trajectory identifier t, which is assigned to the one of them, to the other block (S416).

If the edge trajectory identifier t is assigned to both blocks (NO in S414), the trajectory generating unit 166 replaces a high value of the edge trajectory identifiers t of the extracted block and the value of the edge trajectory identifiers t of all blocks with the same edge trajectory identifier t as the extracted block with a low value (S418). Prior to the grouping processing in S306, the grouping unit 168 obtains beforehand a tilt l of the edge trajectory formed by the block to which the edge trajectory identifier t described above is assigned, and expresses the block as (i, j, d, t, l) (S420).

Next, the trajectory generating unit 166 determines whether or not the horizontal variable i exceeds the maximum value (250 in the present embodiment) of the horizontal block (S422). If the horizontal variable i does not exceed the maximum value (NO in S422), the processings are repeated from the incrementing processing of the horizontal variable i in step S404. If the horizontal variable i exceeds the maximum value (YES in S422), the trajectory generating unit 166 determines whether or not the vertical variable j exceeds the maximum value (80 in the present embodiment) of the vertical block (S424) If the vertical variable j does not exceed the maximum value (NO in S424), t the processings are repeated from the incrementing processing of the vertical variable j in step S402. If the vertical variable j exceeds the maximum value (YES in S424), the edge trajectory generating process is terminated. In this manner, the edge trajectory is generated.

(Edge Trajectory Interpolating Processing S304)

Figure 15:
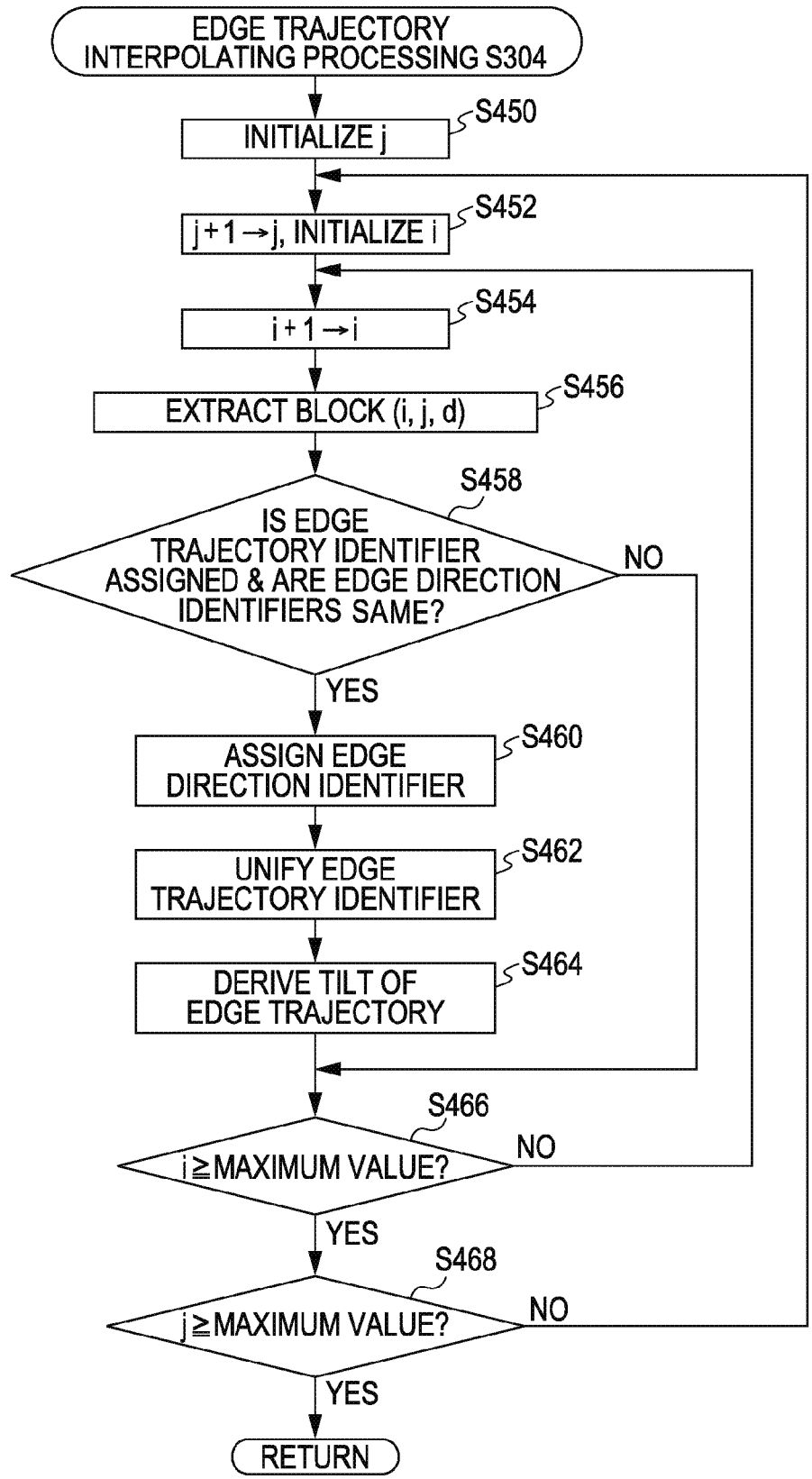
FIG. 15 is a flowchart illustrating a flow of edge trajectory interpolation processing.

As shown in FIG. 15, the trajectory generating unit 166 initializes (in the present embodiment, substitutes "20" to) the vertical variable j for specifying the target region (block) (S450). The trajectory generating unit 166 then adds "1" to the vertical variable j, and initializes (in the present embodiment, substitutes "50" to) the horizontal variable i (S452). Then, the trajectory generating unit 166 adds "1" to the horizontal variable i (S454).

Next, the trajectory generating unit 166 extracts the block (i, j, d) (S456), and determines whether or not the edge trajectory identifier t is assigned to the blocks adjacent to the extracted block, and whether or not the blocks has a same edge direction identifier d (S458). If at least either one of the conditions is not satisfied (NO in S458), the processing in step S466 subsequent thereto is performed. On the other hand, both conditions are satisfied (YES in S458), the trajectory generating unit 166 substitutes the edge direction identifier d of the adjacent blocks to the edge direction identifier d of the extracted block (or replaces the edge direction identifier d of the extracted block with the edge direction identifier d of the adjacent blocks) (S460). The trajectory generating unit 166 also replaces the edge trajectory identifier t of the extracted block with a lower-value edge trajectory identifier t among edge trajectory identifiers t assigned to the adjacent blocks. Further, the trajectory generating unit 166 replaces a high-value of the edge trajectory identifier t of the extracted block and the value of the edge trajectory identifiers t of all blocks with the same edge trajectory identifier t as the extracted block with a low value (S462). In this manner, the grouping unit 168 obtains the tilt l of the unified edge trajectory, and writes the obtained tilt l over all of the combined blocks (S464).

Next, the trajectory generating unit 166 determines whether or not the horizontal variable i exceeds the maximum value (in the present embodiment, 250) of the horizontal block (S466). If the horizontal variable i does not exceed the maximum value (NO in S466), the processings are repeated from the incrementing processing of the horizontal variable i in step S454. If the horizontal variable i exceeds the maximum value (YES in S466), the trajectory generating unit 166 determines whether or not the vertical variable j exceeds the maximum value (in the present embodiment, 80) of the vertical block (S468). If the vertical variable j does not exceed the maximum value (NO in S468), the processings are repeated from the incrementing processing of the vertical variable j in step S452. If the vertical variable j exceeds the maximum value (YES in S468), the interpolating processing of an edge trajectory is terminated.

(Grouping Processing S306)

Figure 16:
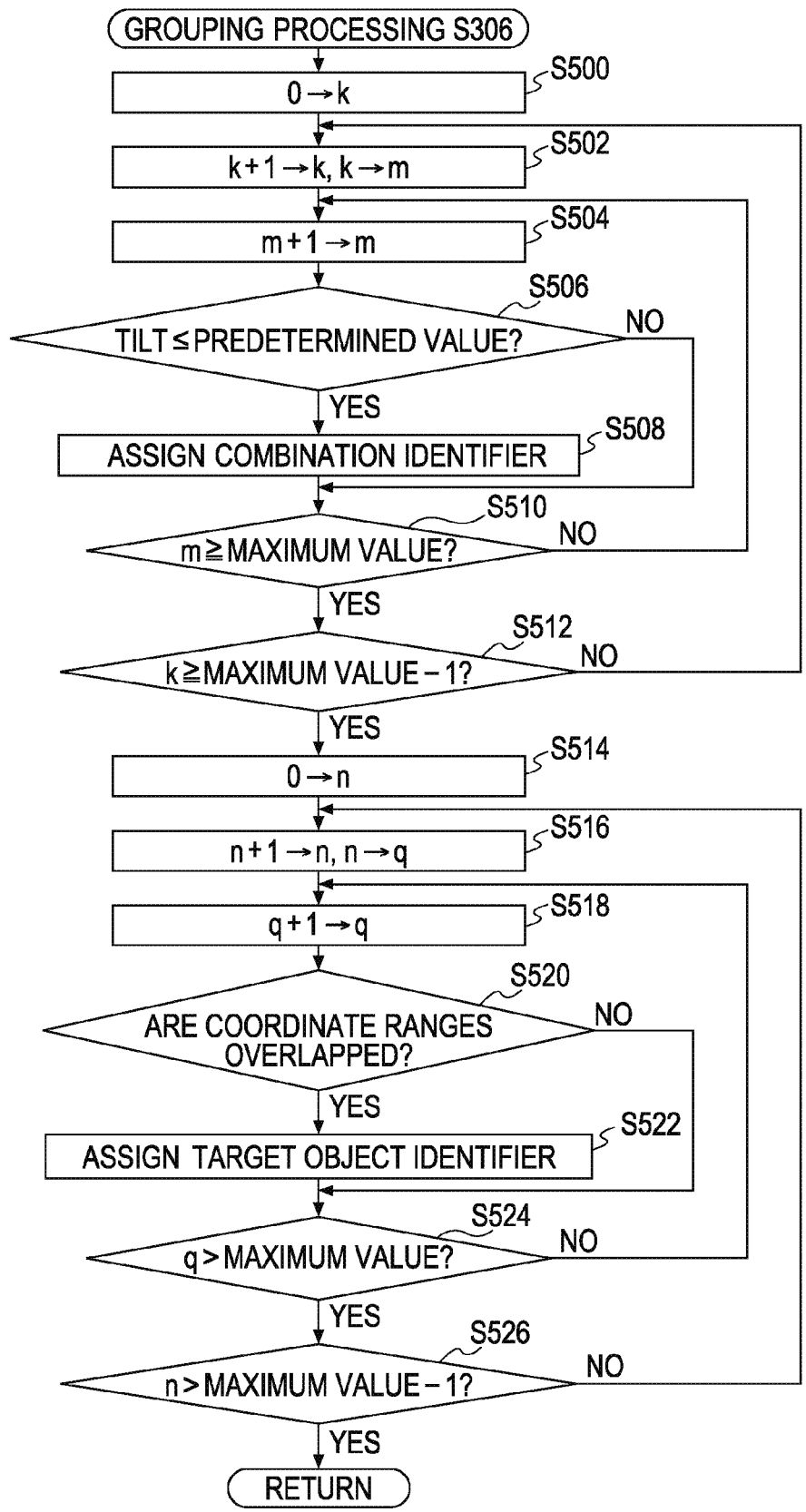
FIG. 16 is a flowchart illustrating a flow of grouping processing.

As shown in FIG. 16, the grouping unit 168 initializes (substitutes "0" to) an edge trajectory variable k for specifying the edge trajectory (S500). The grouping unit 168 then adds "1" to the edge trajectory variable k, and initializes (substitutes k to) an edge trajectory variable m for specifying edge trajectories that are combination candidates (S502). The grouping unit 168 then adds "1" to the edge trajectory variable m (S504) The edge trajectory variables k and m are provided to execute the grouping processing on all combinations of the edge trajectories.

The grouping unit 168 compares the tilt l of the edge trajectory whose edge trajectory identifier t is the edge trajectory variable k and the tilt l of the edge trajectory whose edge trajectory identifier t is the trajectory variable m, and determines whether the angular difference falls within a predetermined value, for example, 5° (S506). If the angular difference is within the predetermined value (YES in S506), the grouping unit 168 assigns the smallest value of the numbers that are not yet used as a combination identifier p with to edge trajectories (S508).

Then, the grouping unit 168 determines whether or not the edge trajectory variable m exceeds the maximum value of the edge trajectory identifier t (S510). If the edge trajectory variable m does not exceed the maximum value (NO in S510), the processings are repeated from the incrementing processing of the edge trajectory variable m in step S504. If the edge trajectory variable m exceeds the maximum value (YES in S510), the grouping unit 168 determines whether or not the edge trajectory variable k exceeds the (maximum value −1) of the edge trajectory identifier t (S512). When the edge trajectory variable k does not exceed the (maximum value −1) (NO in S512), the processings are repeated from the incrementing processing of the edge trajectory variable k in step S502. If the edge trajectory variable k exceeds the (maximum value −1) (YES in S512), the processing in step S514 subsequent thereto is performed.

The grouping unit 168 then initializes (substitutes "0" to) a combination variable n for specifying the combination of edge trajectories (S514). Then, the grouping unit 168 adds "1" to the combination variable n, and initializes (substitutes n to) a combination variable q that is for specifying a combination of edge trajectories that is a candidate for the grouping (S516). The grouping unit 168 then adds "1" to the combination variable q (S518). The edge combination variables n and q are provided in order to perform the grouping processing on all combinations of the edge trajectories.

The grouping unit 168 compares a coordinate range enclosed by the combination of the edge trajectories having the combination identifier p of the combination variable n, and a coordinate range enclosed by the combination of the edge trajectories having the combination identifier p of the combination variable q. The grouping unit 168 determines whether or not the coordinate ranges are overlapped with each other by a predetermined ratio, for example, 80% (S520). In other words, the grouping unit 168 determines whether or not the combination of the edge trajectories having the combination identifier p of the combination variable n and the combination of the edge trajectories having the combination identifier p of the combination variable q forms a rectangle. If the coordinate ranges are overlapped with each other by the predetermined ratio (YES in S520), the grouping unit 168 groups the coordinate ranges enclosed by the two combinations, and assigns a target object identifier a to the grouped range (S522).

Next, the grouping unit 168 determines whether or not the combination variable q exceeds the maximum value of the combination identifier p (S524). If the combination variable q does not exceed the maximum value (NO in S524), the processings are repeated from the incrementing processing of the combination variable q in step S518. If the combination variable q exceeds the maximum value (YES in S524), the grouping unit 168 determines whether or not the combination variable n exceeds the (maximum value −1) of the combination variable p (S526). If the combination variable n does not exceed the (maximum value −1) (NO in S526), the processings are repeated from the incrementing processing of the combination variable n in step S516. If the combination variable n exceeds the (maximum value −1) (YES in S526), the grouping processing is terminated. In this manner, the grouped target object is extracted.

(Specific Object Determining Processing S308)

Figure 17:
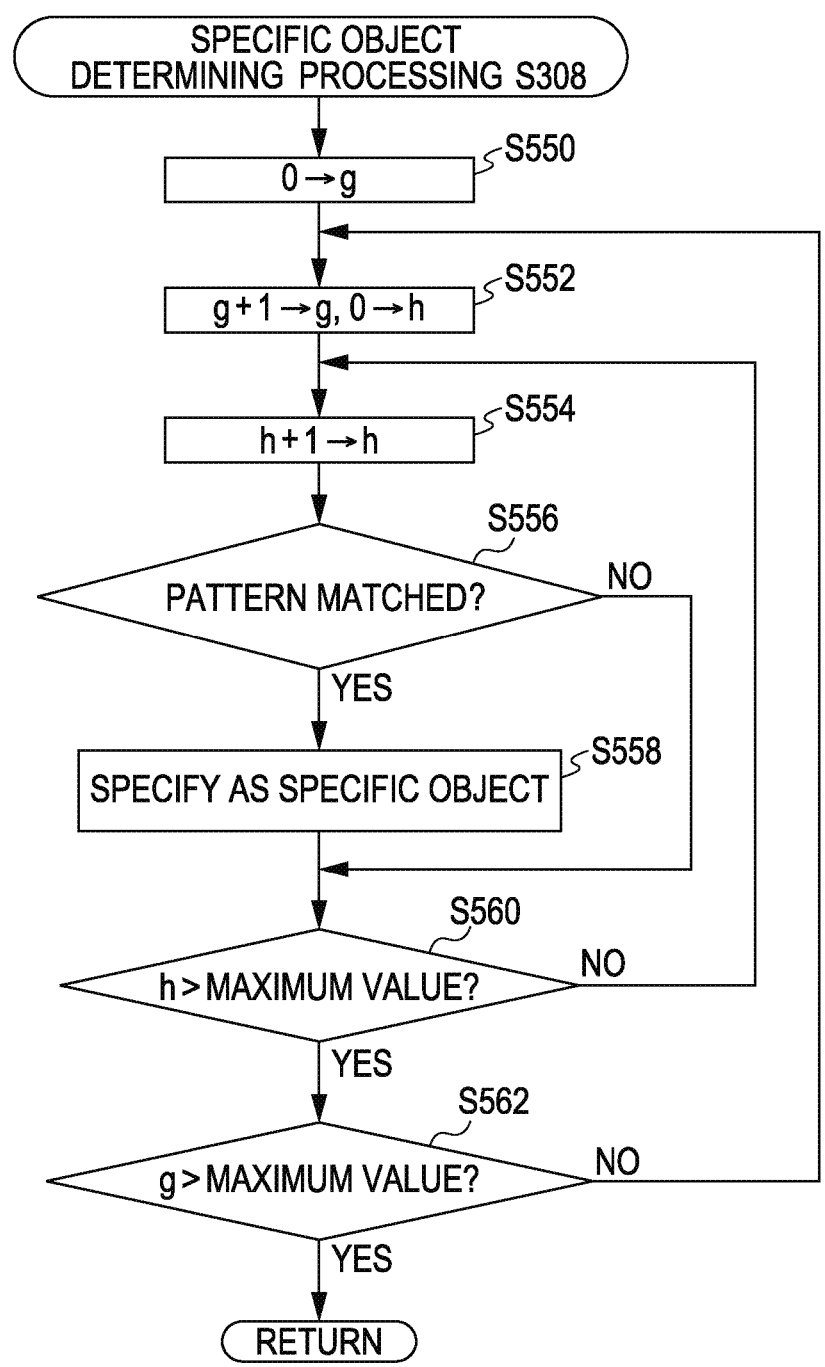
FIG. 17 is a flowchart illustrating a flow of specific object determining processing.

As shown in FIG. 17, the specific object determining unit 170 initializes (substitutes "0" to) a target object variable g that for specifying a target object (S550). The specific object determining unit 170 then adds "1" to the target object variable g, and initializes (substitutes "0" to) a pattern variable h for specifying an outline pattern (S552). The specific object determining unit 170 then adds "1" to the pattern variable h (S554). The target object variable g and the pattern variable h are provided in order to perform the pattern matching on all combinations of a target object and an outline pattern.

The specific object determining unit 170 performs the pattern matching between the target object whose target object identifier o is the target object variable g and the outline pattern whose pattern identifier r is the pattern variable h so as to determine whether or not the outline pattern is matched (S556). When the outline pattern is matched (YES in S556), the specific object determining unit 170 specifies the target object as a specific object whose pattern identifier r is the pattern variable h (S558).

Then, the specific object determining unit 170 determines whether or not the pattern variable h exceeds the maximum value of the pattern identifier r (S560). When the pattern variable h does not exceed the maximum value (NO in S560), the processings are repeated from the incrementing processing of the pattern variable h in step S554. If the pattern variable h exceeds the maximum value (YES in S560), the specific object determining unit 170 determines whether or not the target object variable g exceeds the maximum value of the target object identifier o (S562). If the target object variable g does not exceed the maximum value (NO in S562), the processings are repeated from the incrementing processing of the target object variable g in step S552. If the target object variable g exceeds the maximum value (YES in S562), the target object of determining processing is terminated. In this manner, the grouped target object is formally determined as a specific object.

As described above, the environment recognition device 130 specifies the target object based on the edge direction. Accordingly, it can enhance the efficiency and accuracy of specifying a target object that tilts or that has a curved shape.

In addition, a program for allowing a computer to function as the environment recognition device 130 is also provided as well as a storage medium such as a computer-readable flexible disk, a magneto-optical disk, a ROM, a CD, a DVD, a BD storing the program. Here, the program means a data processing function described in any language or description method.

While a preferred embodiment of the present invention has been described hereinabove with reference to the appended drawings, it is to be understood that the present invention is not limited to such embodiment. It will be apparent to those skilled in the art that various changes may be made without departing from the scope of the invention.

For example, in the above-mentioned embodiment, (A+B)−(C+D) is used as the horizontal-direction component, and (A+C)−(B+D) is used as the vertical-direction component, when an edge direction of a block is derived. However, it is only necessary that the edge direction has any predetermined angle with respect to the direction in which the edge of the luminance of each block extends. Thus, other various combinations can be used, such as the combination of (A+C)−(B+D) as the horizontal-direction component and (A+B)−(C+D) as the vertical-direction component.

In the above-mentioned embodiment, the block is defined as 2×2 pixels. However, the number of pixels is not limited thereto. The block may include more pixels. For example, in the case of 4×4 pixels, the edge direction may be derived based on a difference between totals of the luminances of two left and right regions (2×4 pixels) of two formed by dividing the block in the horizontal direction and a difference between totals of the luminances of two upper and lower regions (4×2 pixels) formed by dividing the block in the vertical direction. The length of a side of the block is not limited to an even number of pixels, but may be an odd number. In this case, a proper value can be derived by excluding a row of pixels or a line of pixels at the center.

In the above-mentioned embodiment, the trajectory generating unit 166 interpolates one block by using an edge trajectory adjacent to the one block. However, the number of blocks to be interpolated is not limited thereto. For example, when a continuity of two edge trajectories with a same edge direction is considered, whereby the blocks between the two edge trajectories may be regarded to have the same edge direction, any number of blocks can be interpolated such that they have the same edge direction.

In the above embodiment, the three-dimensional position of the target object is derived based on the parallax between image data using the plurality of image capturing devices 110. However, the present invention is not limited to such case. Alternatively, for example, a variety of known distance measuring devices such as a laser radar distance measuring device may be used. In this case, the laser radar distance measuring device emits laser beam to the detection area 122, receives light reflected when the laser beam is irradiated the object, and measures the distance to the object based on the time required for this event.

The above embodiment describes an example in which the position information obtaining unit 162 receives the distance image (parallax information) 126 from the image processing device 120, and generates the three-dimensional position information. However, the present invention is not limited to such case. The image processing device 120 may generate the three-dimensional position information in advance, and the position information obtaining unit 162 may obtain the generated three-dimensional position information. Such a functional distribution can reduce the processing load of the environment recognition device 130.

In the above-mentioned embodiment, the position information obtaining unit 158, the region limiting unit 160, the luminance obtaining unit 162, the edge deriving unit 164, the trajectory generating unit 166, the grouping unit 168, and the specific object determining unit 170 are configured to be operated by the central control unit 154 with software. However, the functional units can be configured with hardware.

The specific object determining unit 170 determines a target object as a specific object through the pattern matching. However, the present invention is not limited to such case. The specific object determining unit 168 may determine a specific object when various other conditions are also satisfied. For example, a specific object may be determined when a shift, the relative distance in the width direction x and the height direction y, is substantially constant (continuous) in a target object or when the relative movement speed in the depth direction z is constant. Such a shift of the relative distance in the width direction x and the height direction y in the target object may be specified by linear approximation by the Hough transform or the least squares method.

The steps of the environment recognition method in this specification do not necessarily need to be processed chronologically according to the order described in the flowchart. The steps may be processed in parallel, or may include processings using subroutines.

The present invention can be used for an environment recognition device and an environment recognition method for recognizing a target object based on the luminances of the target object in a detection area.

The invention claimed is:

1. An environment recognition device comprising:
   a luminance obtaining unit that obtains a luminance of each block formed by dividing a detection area in a luminance image;
   an edge deriving unit that derives an edge direction based on a direction in which an edge depending on the luminance of each block extends;
   a trajectory generating unit that associate the blocks based on the edge direction so as to generate an edge trajectory;
   a grouping unit that groups regions enclosed by the edge trajectories as a target object; and
   a specific object determining unit that determines the target object as a specific object, wherein
   the edge deriving unit derives the edge direction based on a difference between totals of the luminances in two left and right regions formed by dividing the block in a vertical direction, and a difference between totals of the luminances in two upper and lower regions formed by dividing the block in a horizontal direction, and
   when the absolute value of the difference between the totals of a direction is not more than a predetermined threshold value, the edge deriving unit derives the edge direction without using the difference between the totals of the direction.

2. The environment recognition device according to claim 1, wherein the predetermined threshold value is obtained by an increasing function according to an average of all luminances in the block.

3. The environment recognition device according to claim 1, wherein the trajectory generating unit interpolates an edge direction of any block based on the edge direct ion of each block adjacent to the arbitrary block.

4. The environment recognition device according to claim 1, further comprising a region limiting unit that limits a region from which a luminance is to be obtained by the luminance obtaining unit to a region that includes an infinity point and is smaller than the detection area.

5. An environment recognition method comprising:
   obtaining a luminance of each block formed by dividing a detection area in a luminance image;
   deriving an edge direction based on a direction in which an edge depending on the luminance of each block extends;
   associating the blocks based on the edge direction so as to generate an edge trajectory;
   grouping regions enclosed by the edge trajectories as a target object; and
   determining the target object as a specific object, wherein
   the edge deriving step derives the edge direction based on a difference between totals of the luminances in two left and right regions formed by dividing the block in a vertical direction, and a difference between totals of the luminances in two upper and lower regions formed by dividing the block in a horizontal direction, and
   when the absolute value of the difference between the totals of a direction is not more than a predetermined threshold value, the edge deriving step derives the edge direction without using the difference between the totals of the direction.

* * * * *